(12) United States Patent
Mandin et al.

(10) Patent No.: US 6,691,069 B1
(45) Date of Patent: Feb. 10, 2004

(54) METHODS AND APPARATUS FOR DATA RETRIEVAL, STORAGE AND ANALYSIS

(75) Inventors: Terry Mandin, Calgary (CA); Nurani Latif, Miami, FL (US); Andy Griffiths, Calgary (CA)

(73) Assignee: Honeywell International Inc., Morristown, NJ (US)

( * ) Notice: Subject to any disclaimer, the term of this patent is extended or adjusted under 35 U.S.C. 154(b) by 187 days.

(21) Appl. No.: 10/033,094

(22) Filed: Oct. 25, 2001

(51) Int. Cl.[7] .............................................. G06F 15/00
(52) U.S. Cl. ........................................ 702/187; 707/1
(58) Field of Search ............................. 702/187; 707/1, 707/3; 709/331, 202; 600/300, 561; 345/835

(56) References Cited

U.S. PATENT DOCUMENTS 5,745,113 A * 4/1998 Jordan et al. ............... 345/835
6,141,699 A * 10/2000 Luzzi et al. ................ 709/331
6,513,031 B1 * 1/2003 Fries et al. ..................... 707/3
2002/0165845 A1 * 11/2002 Gogolak ......................... 707/1

* cited by examiner

*Primary Examiner*—John Barlow
*Assistant Examiner*—Xiuqin Sun
(74) *Attorney, Agent, or Firm*—Ohlandt, Greeley, Ruggiero; Anthony Miologos

(57) ABSTRACT

A network interactive apparatus and a method for the retrieval, storage and analysis of time variable data. An interactive session is conducted with a user via a network, such as the network may be the Internet or World Wide Web, to obtain a user definition of a first time variable data item, its location on the network, and a sampling interval. The values or content of the data item are then obtained at sample times defined by the sampling interval. Another interactive session is conducted to determine a second data item for comparative analysis with the first data item. The analysis is then presented to the user in a format such as a graph, a table, or the like.

16 Claims, 9 Drawing Sheets

METHODS AND APPARATUS FOR DATA RETRIEVAL, STORAGE AND ANALYSIS

FIELD OF INVENTION

This invention relates to a network interactive apparatus and a method for identifying a time variable data item, the retrieval of the content of the data item at different times and the presentation of the data in a desired analysis format.

BACKGROUND OF INVENTION

Networks, such as the Internet, the World Wide Web (WWW), and the like, provide a communication medium for rapid access to an enormous amount of information. Time variable data, such as commodity prices and futures, utility costs, weather, stock prices and the like, are factors that are useful in business planning. Currently available procedures notify a user of a change of such data, e.g., a stock price, or of its value or content on demand. However, when it is desired to analyze a relation between a first data item and a second data item, the user must go to different web sites to retrieve both data items and then conduct the analysis.

In the process control industry, it is known to collect the values of time variable data items (e.g., pressure and temperature), build a history of the values over time and conduct various analyses thereof. Generally, the data items and analyses are specified for the process being controlled. That is, there is little flexibility for a user to define data items or variables outside of the universe allowed by the process design.

There is a need for a system and method that permits the retrieval, development of a content history and analysis of one or more data items without regard to a particular process. Also, the system and method should not require a user to actively seek out different web sites, collect the data content over time and then generate an analysis.

SUMMARY OF INVENTION

The foregoing needs are satisfied with the method of the present invention, which utilizes a communication network, such as the Internet, the WWW or the like, to facilitate the gathering of time variable data items of any nature, building a history thereof over time and providing an analysis thereof. In an interactive session with a user, a first time variable data item, its location on the network and a sampling interval are determined. The content, or value, of the data item is retrieved from the network location at sample times defined by the sampling interval. A history of the contents is built and stored. A second data item is determined for a comparative analysis with the first data item. The comparative analysis is then presented to the user. For example, the prices of two or more stocks over a time range can be compared in a format, such as a graph, a table or the like. As another example, the price of a utility stock or the cost of energy could be compared to temperature.

The apparatus of the present invention comprises a computer that includes a program that performs the method of the invention. A storage medium of the present invention stores a program that controls a computer to perform the method of the invention.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
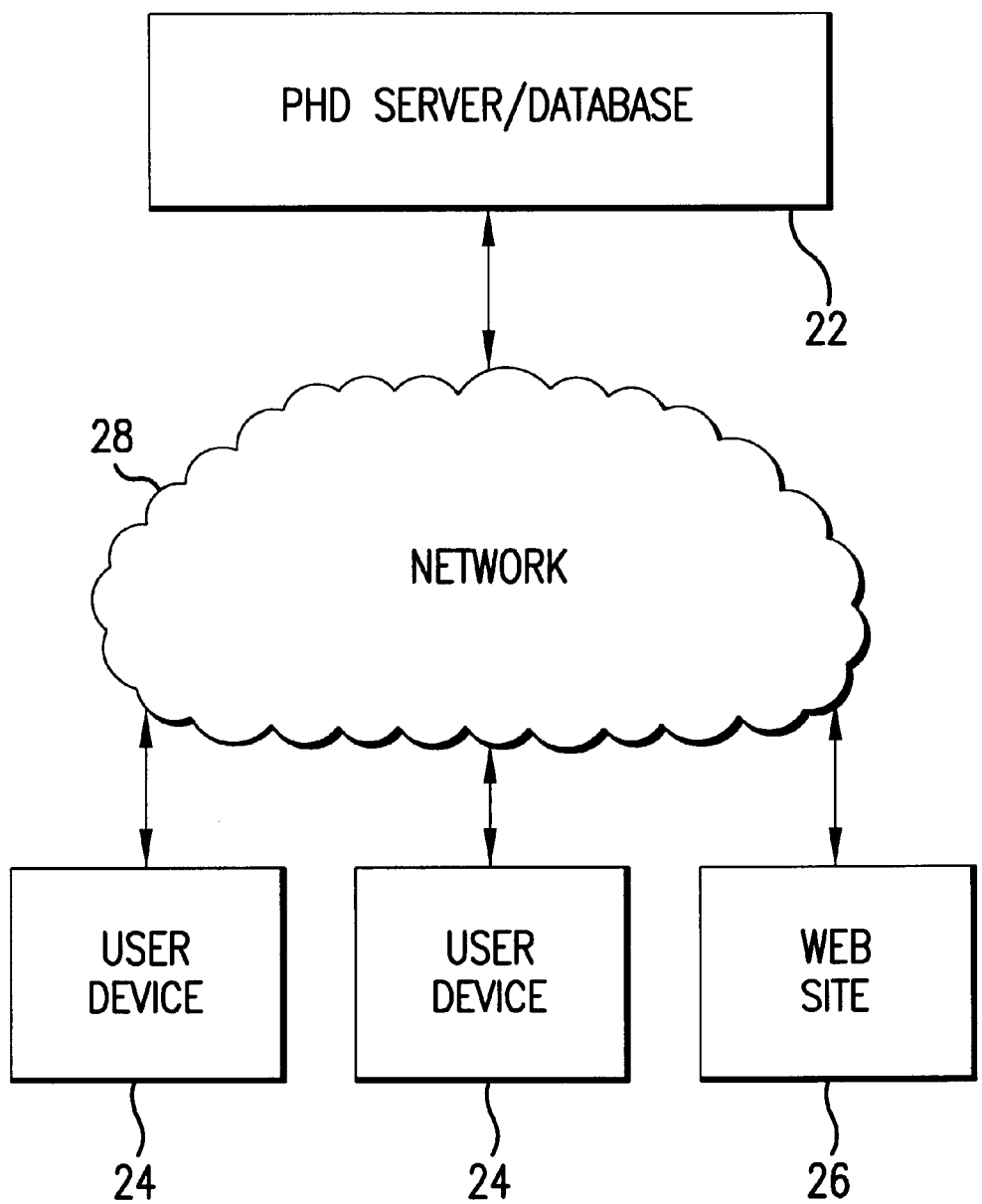
FIG. 1 is a block diagram of a system that includes the network interactive apparatus of the present invention.

Referring to FIG. 1, a network interactive apparatus, shown as a PHD server/database 22, communicates with a plurality of user devices 24 via a network 28. Also connected to network 28 are a plurality of web sites, of which only one, web site 26, is shown. User devices 24 may be any suitable device upon which a browser may run, such as a personal computer, a telephone, a television set, a hand held computing device and the like. It will be appreciated by those skilled in the art that the number of user devices and web sites is limited only by the capacity of network 28. Network 28 may be an Internet, a WWW, an Intranet, a wired or wireless telephone network, and the like, or any combination thereof.

PHD server/database 22 may be a single computer with a memory system for the storage of data or may comprise a separate computer server and a separate database that are interconnected directly or via network 28. PHD server/database 22 may be any suitable server, presently known or developed in the future, that is capable of communicating via network 28 with user devices 24 in a protocol that is compatible with the browser capability of user devices 24 and that is capable of running applications that supply web page data and interact with web page actions taken by user devices 24.

Figure 2:
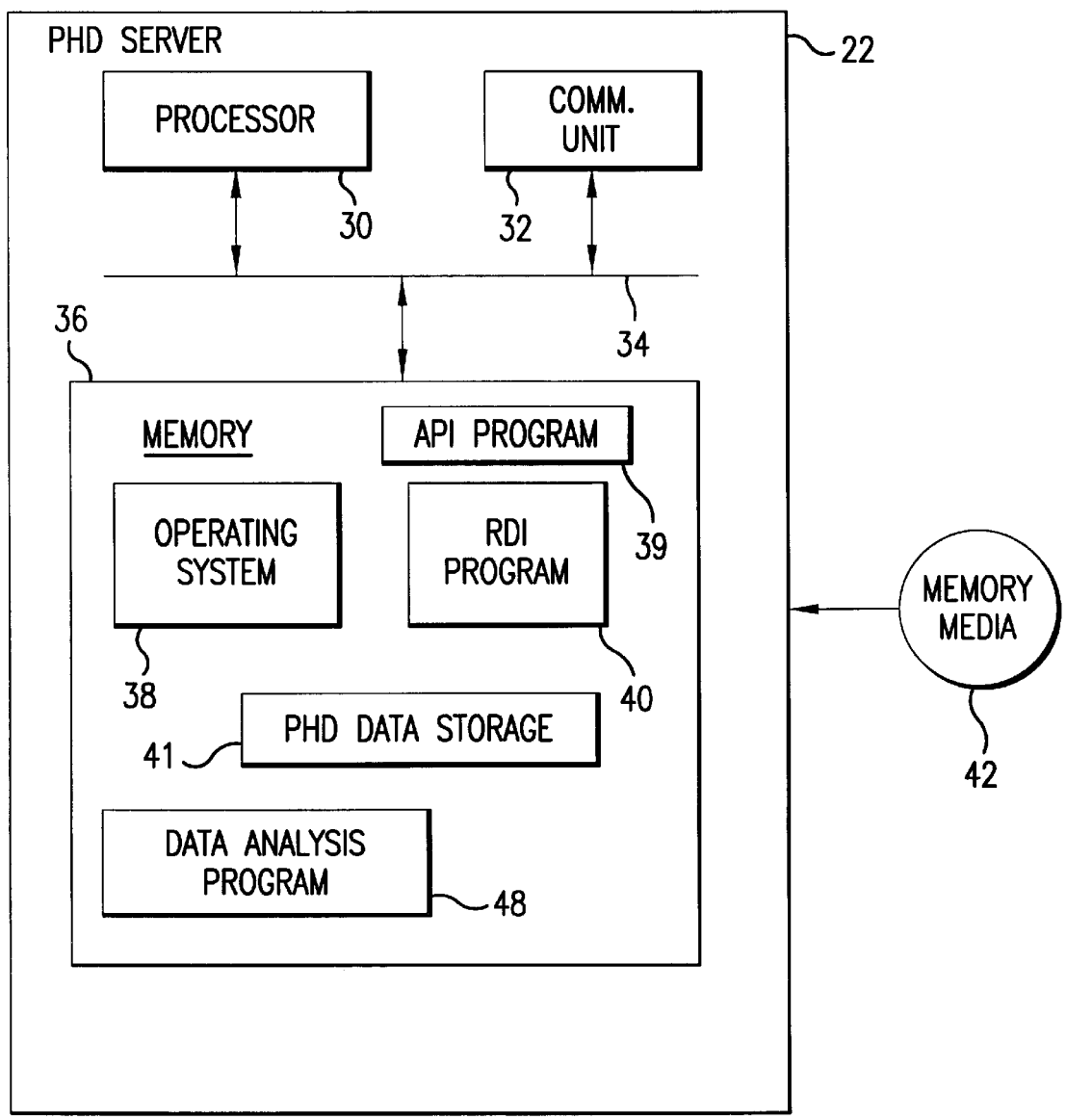
FIG. 2 is a block diagram of the PHD server/database of the FIG. 1 system.

Referring to FIG. 2, PHD server/database 22 includes a processor 30, a communications unit 32 and a memory 36 that are interconnected via a BUS 34. Memory 36 includes an operating system 38, an API program 39, a RDI program 40, a PHD data storage 41, and a data analysis program 48. Other programs, such as utilities and other applications, may also be stored in memory 36. All of these programs may be loaded into memory 36 from a storage medium, such as a hard disk 42.

Processor 30 is operable under the control of operating system 38 to execute RDI program 40 to collect data from web site 26 via network 28. API program 39 is operable under the control of operating system 38 to present web pages via communication unit 32 to user devices 24 during a session and to receive and interact with responses from user devices 24. The web pages, if frequently served, may reside in a cache (not shown) of memory 36.

API program 39 and data analysis program 48 conduct interactive sessions with a user device 24. RDI program 40 automatically gathers data from web sites via network 28 and builds a history of the content or value of the data over time.

Figure 3:
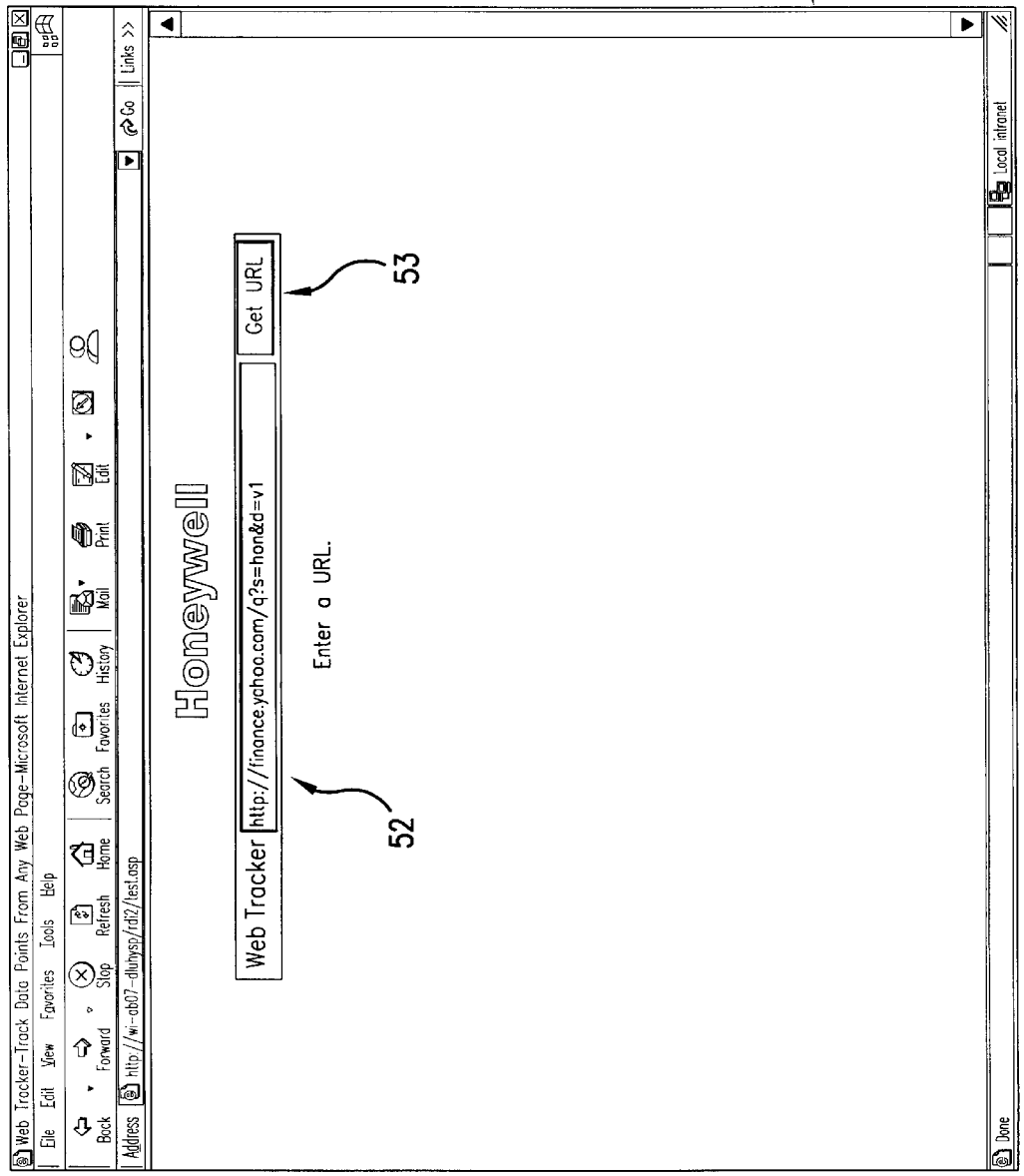
FIGS. 3–5 depict display screens that can be used to configure the API program of the FIG. 2 computer.

API program 39 will initially be described for a typical session with user device 24. With reference, to FIG. 3, a web page 50 is presented to user device 26. Web page 50 includes an area 52 for the user to enter a location in the form of a uniform resource locator (URL) or WWW address of a web site that either contains the data or a pointer to another web site that does. User selection of a 'Get URL' button 53 causes API program 39 to retrieve and present the data to user device 24.

Figure 4:
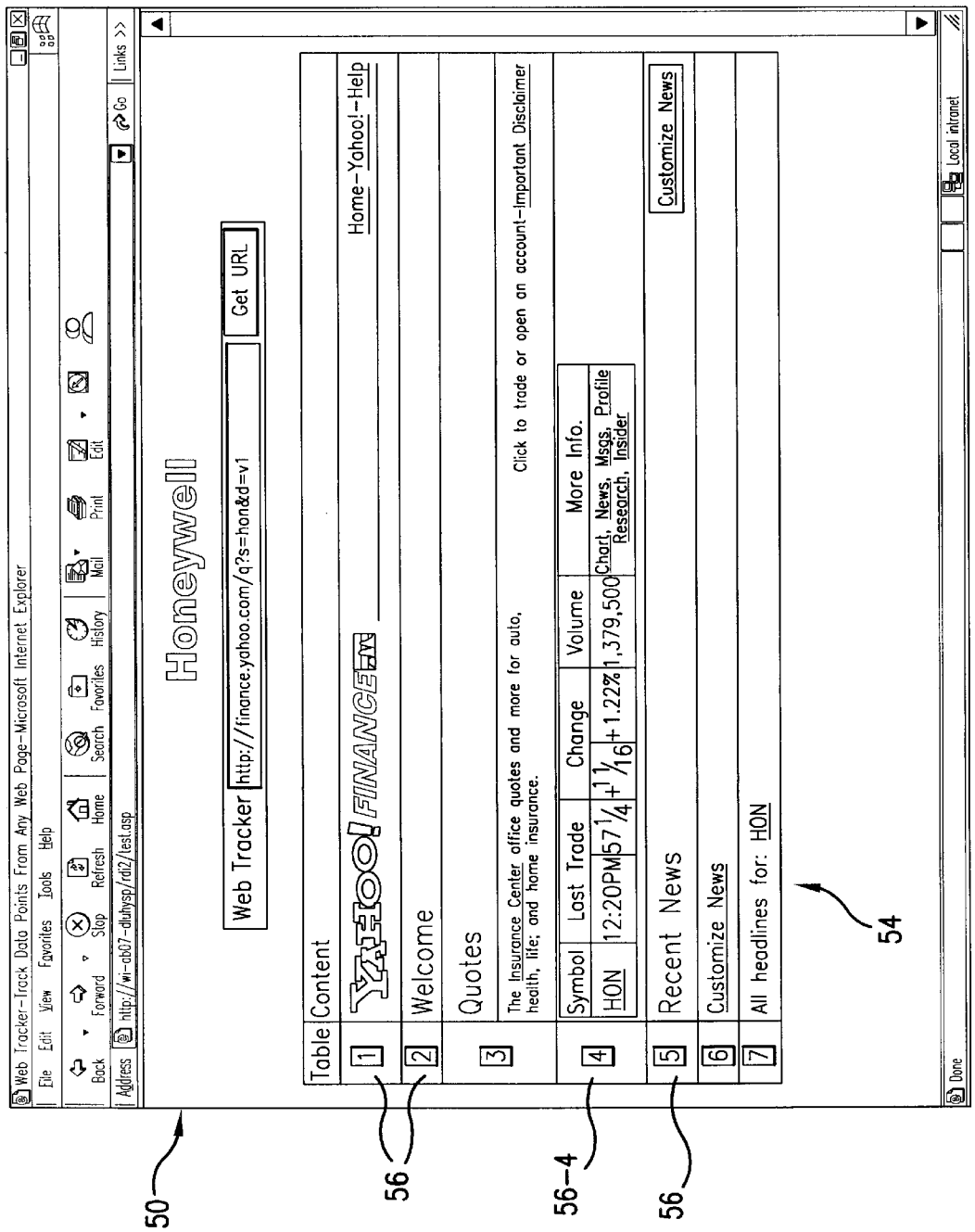
Figure 5:
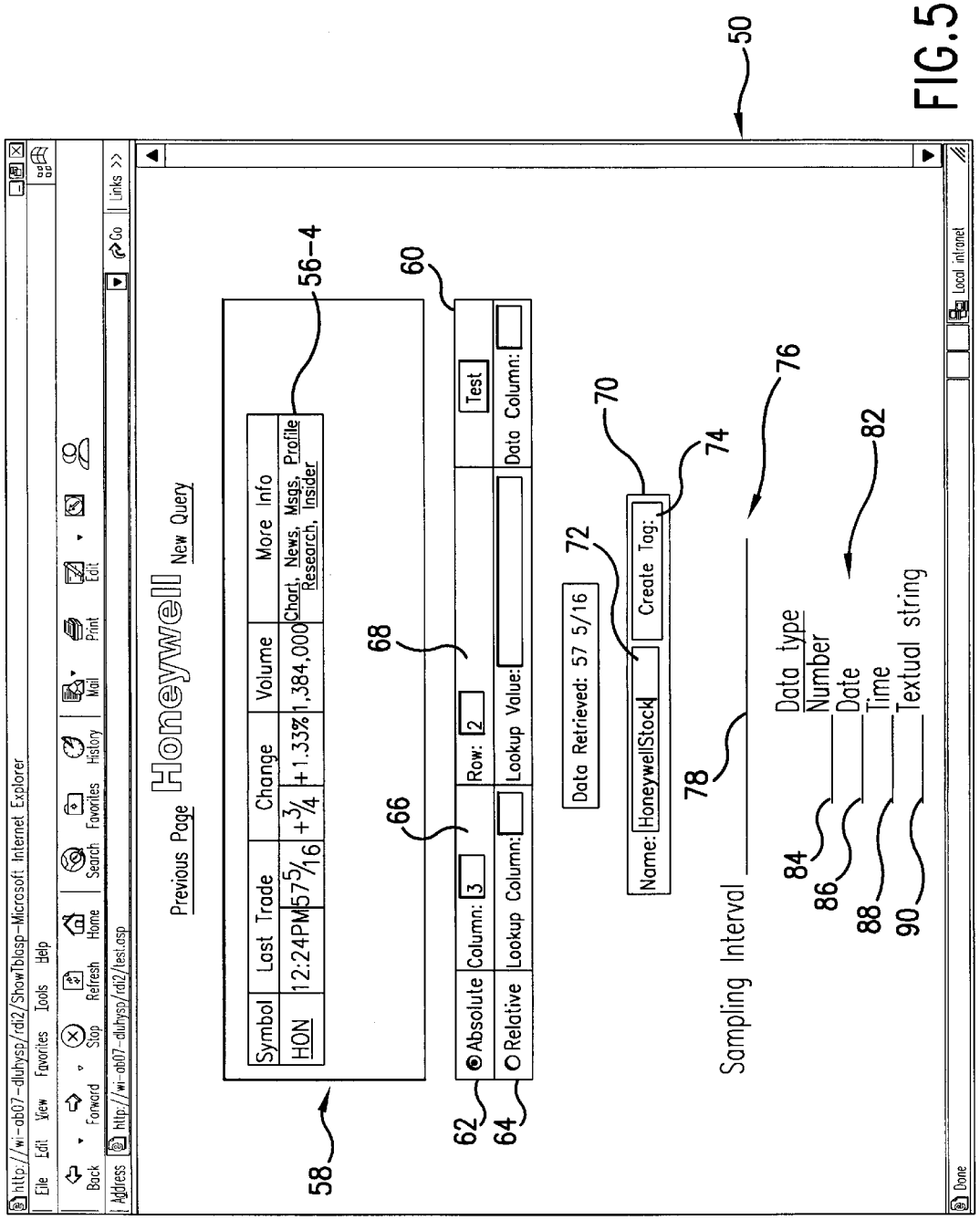

Referring to FIG. 4, the data of the selected web site is displayed at an area 54 of web page 50. In the example shown in the drawing, the web site contains financial news and stock prices. This data is presented in several tables 56 that are identified with table selection buttons that are numbered 1 through 7. Selection of a table 56-4 by operation of table selection button 4 causes the presentation of a further area 58 shown in FIG. 5.

Area 58 contains table 56-4, a selector 60, a name identifier 70, a sampling interval area 76 and a data type area 82. Selector 60 includes a line 62 for selection of an absolute address of a data item contained in table 56-4 and a line 64 for selection of a relative address of the data item. For example, to select the stock price, the user enters 3 and 2 in the column and row entry spots 66 and 68, respectively, of absolute address line 62. Relative address line 64 is used, when more than one row of data is present, to identify a look-up column and a look-up value. If the look-up value is found in a row of the look-up column, a value will be taken from the data column of that row. The user specifies a column number for the data to retrieve. For example, to look up hockey points for Jagr in the following table, the value from column 2 is specified for the case where column 1="Jagr".

| | |
|---|---|
| Sutter | 60 |
| Jagr | 55 |
| Smith | 50 |
| Fleury | 44 |

This is important when data is sorted as the "absolute" row in which the data that will be entered is unknown.

Name identifier 70 includes a name entry area 72 and a create tag button 74. The user enters a name for the data item, for example, Honeywell stock, in name area 72 and then selects create tag button 74 to complete the entry.

Sampling interval area 76 includes an entry area 78 for entry of a sampling interval. For example, the sample interval may be a number of seconds apart (e.g., 60 seconds), and the like data type area 82 includes a number spot 84, a date spot 86, a time spot 88 and a textual string spot 90 that define the type of the data item being identified. For example, number spot 84 is selected if the data item is a number. It will be apparent to one skilled in the art that though areas 52, 54, 56, 58, 76 and 82 are presented on the same web page 50, they could be presented on two or more web pages.

Figure 6:
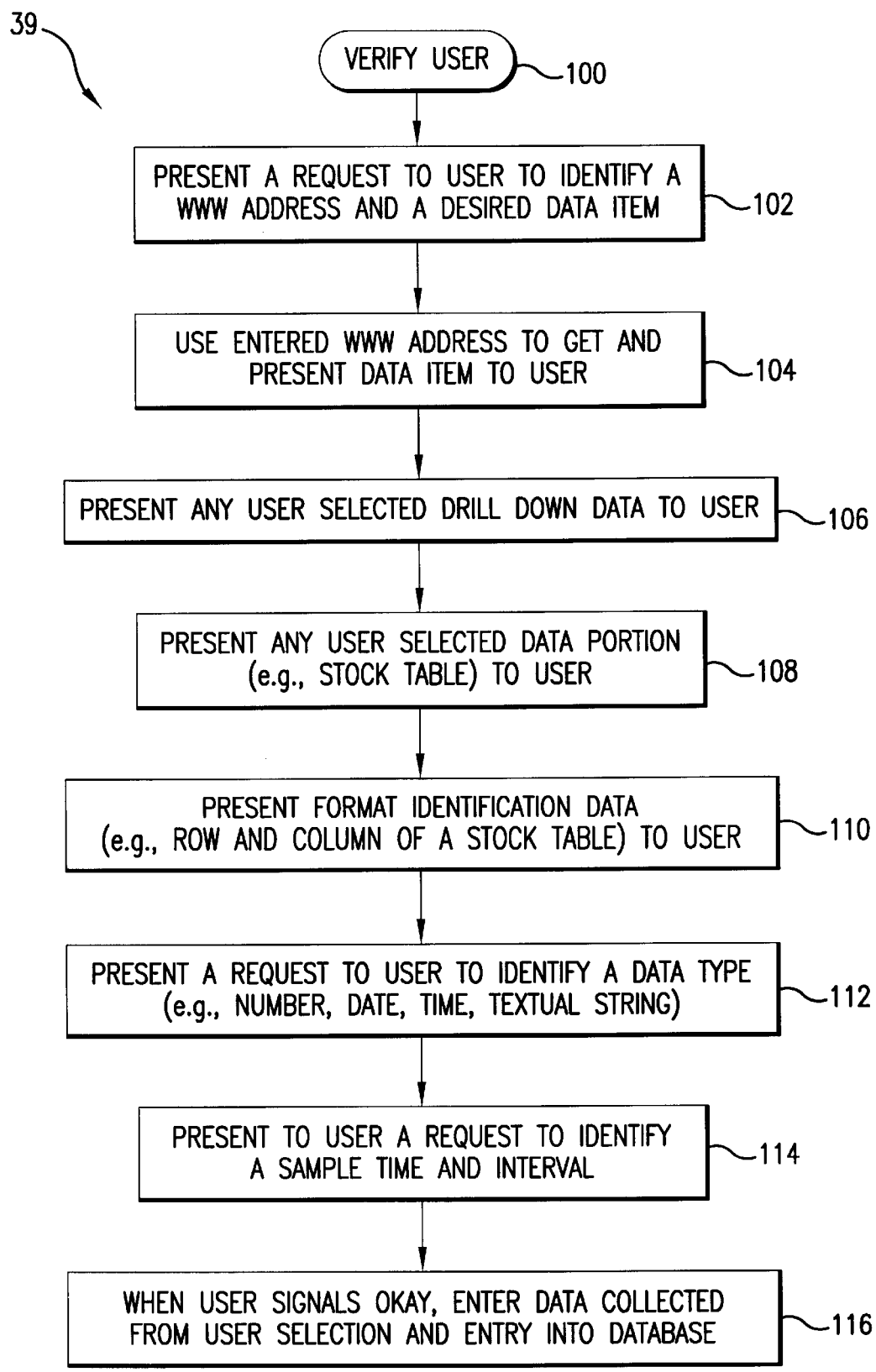
FIG. 6 is a flow diagram of the API program of the FIG. 2 computer.

Referring to FIG. 6, API program 39 begins at step 100 with a verification of the user's identity. Step 102 then presents web page 50 to user device 24 with area 52 for user entry of a web site address. Step 104 retrieves the data from the web site and presents it in area 54 of web page 50. Step 106 then presents any drill down data selected by the user by a drill down procedure. Step 108 presents any user selected data portion, such as table 56-4 of tables 56. Step 110 presents a format identification selector 60 and name identifier 70 on web page 50. Step 112 presents data type area 82 and step 114 presents sampling interval area 76. In step 116, when the user signals okay, all of the data selected or entered is collected and stored in memory 36.

Figure 7:
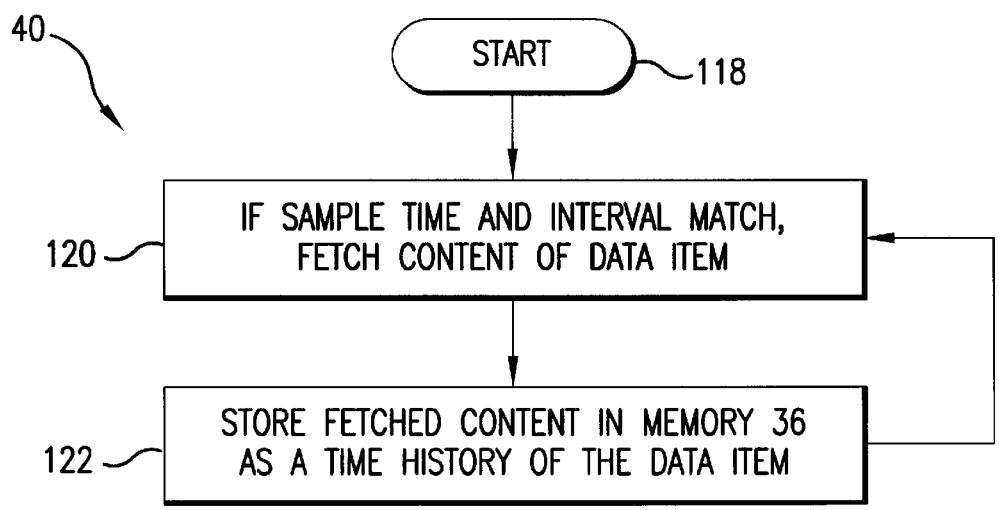
FIG. 7 is a flow diagram of the RDI program of the FIG. 2 computer.

Referring to FIG. 7, RDI program 40 begins with start step 118 and proceeds to step 120. Step 120 determines if the current time and date match the sample time and interval of the data item and, if so, retrieves the current content of the data item. Step 122 stores the retrieved content in memory 36 and returns control to start step 120.

Figure 8:
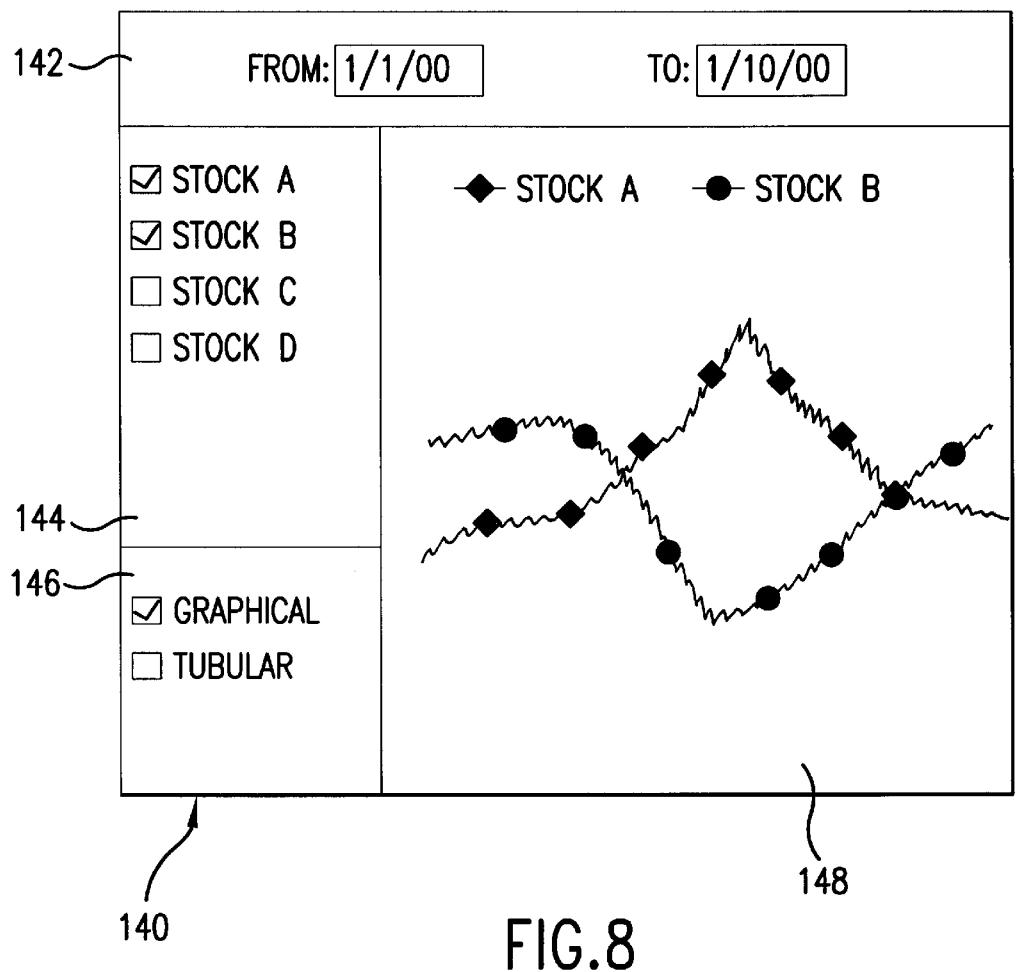
FIGS. 8 and 9 depict display screens that can be used with the data analysis program of the FIG. 2 computer.

Referring to FIG. 8, a web page 140 includes an area 142 for entry of a time range, an area 144 for entry of two or more stocks to be compared, an area 146 for entry of the comparison format and an area 148 for presentation of the comparison. In this example, the date range from Jan. 1, 2000, to Jan. 10, 2000, is entered into area 142, stocks A and B are entered into area 144 and graphical format is entered into area 146. An analysis of stocks A and B is then presented in graphical form in area 148.

Figure 9:
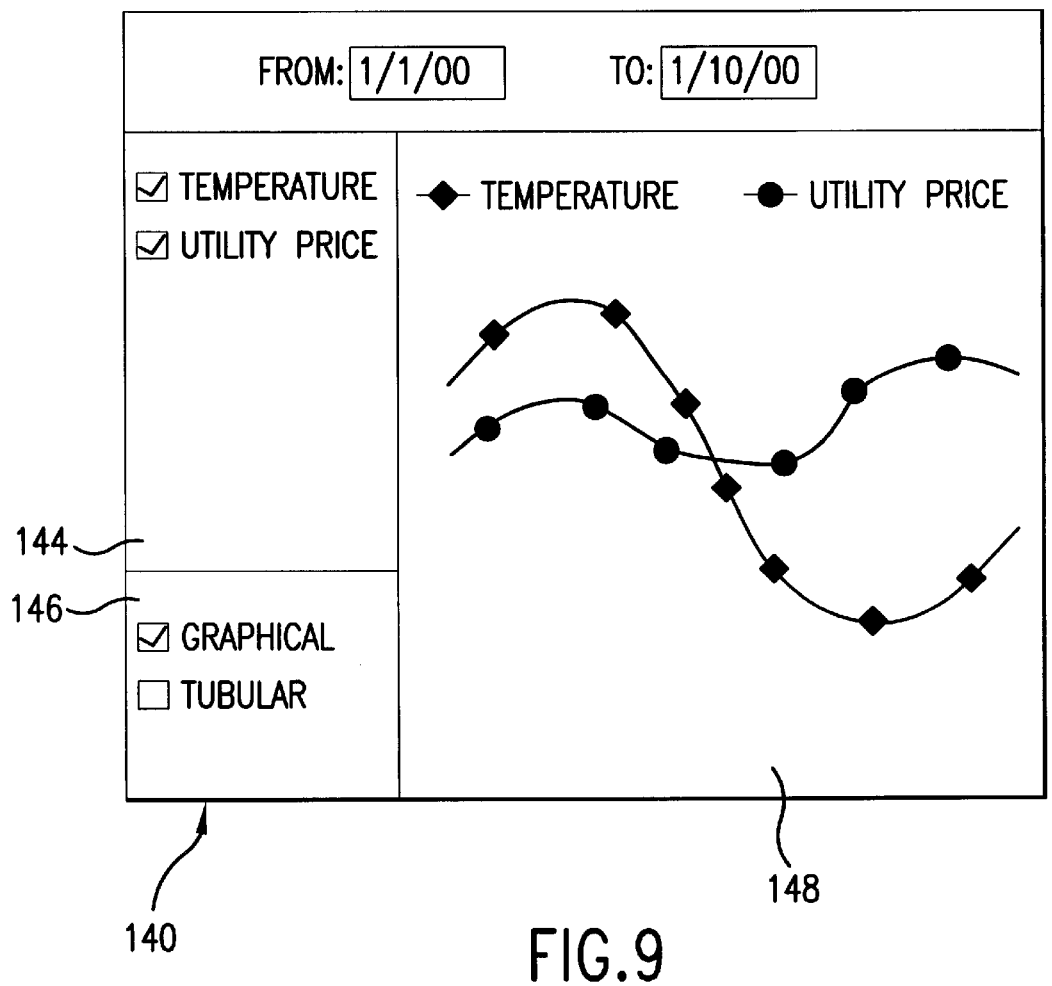

Referring to FIG. 9, web page 140 is shown for a comparison of a utility stock price with temperature. For this example, the date range is Jan. 1, 2000, to Jan. 10, 2000, the data items to be compared are the utility stock price and the temperature and the comparison format is graphical. Graphs of the temperature and the stock price are presented in analysis area 148.

Figure 10:
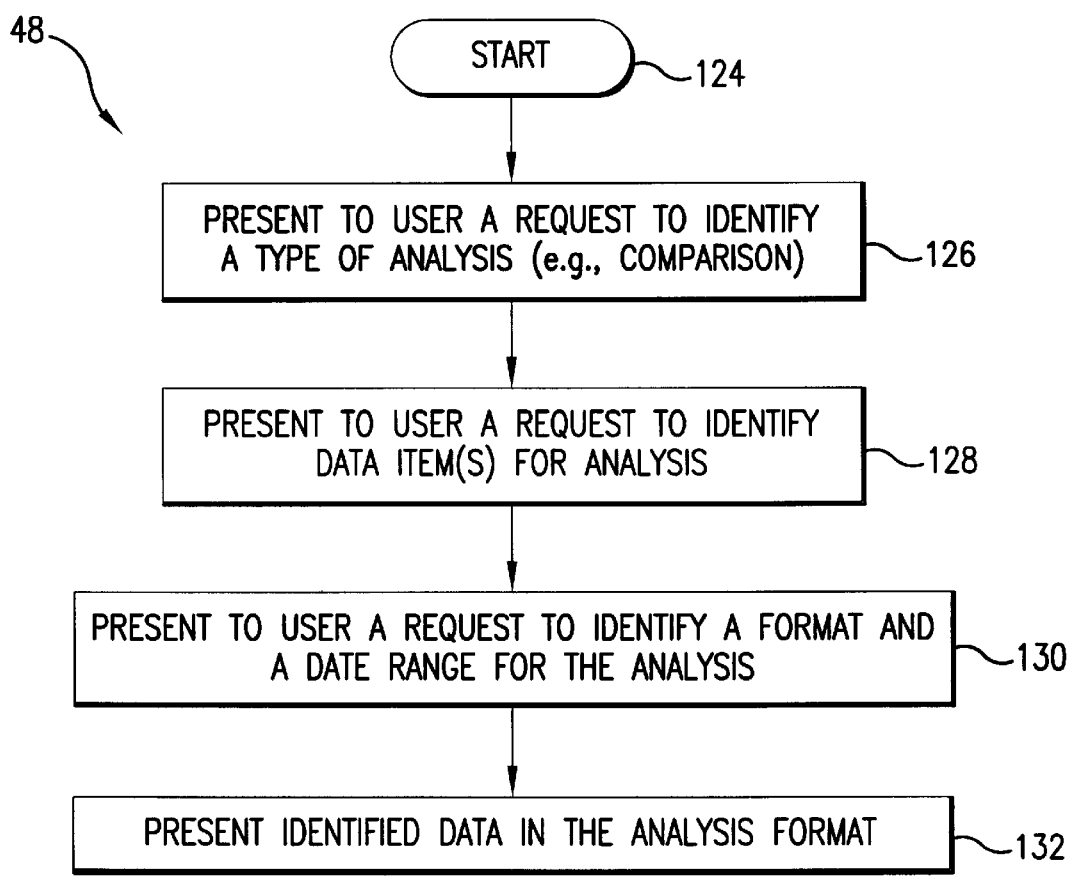
FIG. 10 is a flow diagram of the data analysis program of the FIG. 2 computer.

Referring to FIG. 10, data analysis program 48 begins at start step 124 and control passes to step 126. Step 126 presents a request web page 140 (FIGS. 8 and 9) to user device 24 for the user to identify a type of analysis in area 146. Step 128 presents area 144 for the user to identify the data items to be compared and step 130 presents area 142 for the user to identify the date range of the comparison. Step 132 then presents the analysis in area 148.

The present invention having been thus described with particular reference to the preferred forms thereof, it will be obvious that various changes and modifications may be made therein without departing from the spirit and scope of the present invention as defined in the appended claims.

What is claimed is:

1. An interactive method for gathering and analyzing data items comprising:
   (a) determining in an interactive session with a user a first time variable data item and its location on a network and a sampling interval, wherein said sampling interval defines a plurality of sample times, said interactive session including;
      (a1) presenting a web page for said user to identify said location,
      (a2) presenting said data item to said users,
      (a3) presenting a plurality of data types from a group consisting of number, date, time and textual string for the user to identify one or more of said data types for said data item,
      (a4) requesting said user to identify said sampling interval;
   (b) retrieving a content of said data item from said location to build a history of contents retrieved at different ones of said sample times; and
   (c) determining a second data item for a comparative analysis with said first data item and presenting said comparative analysis to said user.

2. The method of claim 1, wherein step (a2) presents said data item to said user for identification of a portion of said data item, and wherein step (a3) permits the user to identify said one or more data types for said portion of said data item.

3. The method of claim 1, wherein said user identifies a sub data item of said data item by a drill down procedure, and wherein said user identifies said one or more data types and said sampling interval for said sub data item.

4. The method of claim 1, wherein step (a2) presents said data item in a table, and wherein step (a3) requests said user to identify a row and column of said table where said portion is located.

5. The method of claim 1, wherein step (c) further comprises: (c1) presenting to said user a request to identify a type of said analysis.

6. The method of claim 5, wherein said type of analysis includes a comparison with another data item, and wherein step (c) further comprises (c2) presenting to said user a request to identify a comparison format and a time range for the comparison.

7. The method of claim 1, wherein said interactive session is a first interactive session, and wherein step (c) is conducted during a second interactive session.

8. An apparatus for gathering and analyzing data items comprising:
   a computer including a processor;
   (a) first means for performing a first operation that determines in an interactive session with a user a first time variable data item and its location on a network and a sampling interval, wherein said sampling interval defines a plurality of sample times, said interactive session including;
      (a1) presenting a web page for said user to identify said location,
      (a2) presenting said data item to said user,
      (a3) presenting a plurality of data types from a group consisting of number, date, time and textual string for the user to identify one or more of said data types for said data item,
      (a4) requesting said user to identify said sampling interval;
   (b) second means for performing a second operation that retrieves a content of said data item from said location to build a history of contents retrieved at different ones of said sample times; and
   (c) third means for performing a third operation that determines a second data item for a comparative analysis with said first data item and presenting said comparative analysis to said user.

9. The apparatus of claim 8, wherein operation (a2) presents said data item to said user for identification of a portion of said data item, and wherein operation (a3) permits the user to identify said one or more data types for said portion of said data item.

10. The apparatus of claim 8, wherein said user identifies a sub data item of said data item by a drill down procedure, and wherein said user identifies said one or more data types and said sampling interval for said sub data item.

11. The apparatus of claim 8, wherein operation (a2) presents said data item in a table, and wherein operation (a3) requests said user to identify a row and column of said table where said portion is located.

12. The apparatus of claim 8, wherein said third operation comprises the further operation of: (c1) presenting to said user a request to identify a type of said analysis.

13. The apparatus of claim 10, wherein said type of analysis includes a comparison with another data item.

14. The apparatus of claim 11, wherein step (c) further comprises (c2) presenting to said user a request to identify a comparison format and a time range for the comparison.

15. The apparatus of claim 8, wherein said interactive session is a first interactive session, and wherein said third operation is conducted during a second interactive session.

16. A storage medium for a computer having a processor, said storage medium comprising:
   first means for controlling said processor to perform a first operation that determines in an interactive session with a user a first time variable data item and its location on a network and a sampling interval, wherein said sampling interval defines a plurality of sample times, said interactive session including;
      presenting a web page for said user to identify said location,
      presenting said data item to said user,
      presenting a plurality of data types from a group consisting of number, date, time and textual string for the user to identify one or more of said data types for said data item,
      requesting said user to identify said sampling interval;
   second means for controlling said processor to perform a second operation that retrieves a content of said data item from said location to build a history of contents retrieved at different ones of said sample times; and
   third means for controlling said processor to perform a third operation that determines a second data item for a comparative analysis with said first data item and presenting said comparative analysis to said user.

* * * * *